Oct. 29, 1957  D. M. SCHWARTZ  2,811,259
FILTER VALVE CONSTRUCTION
Original Filed Oct. 3, 1947  2 Sheets-Sheet 2
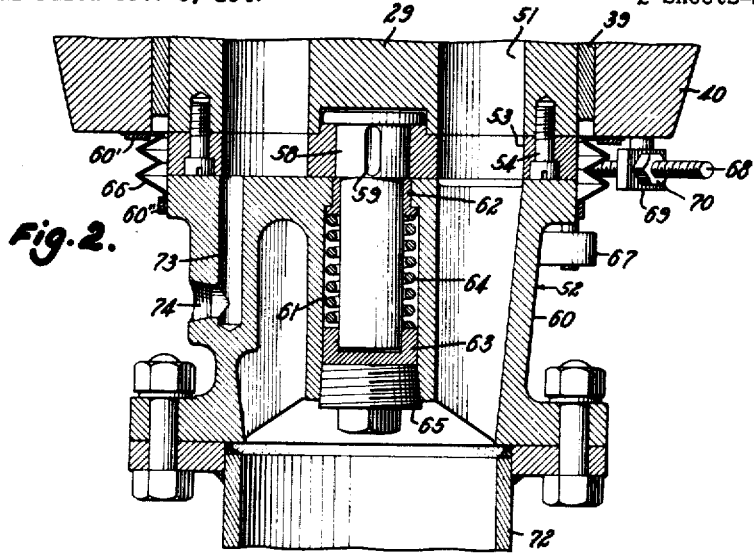
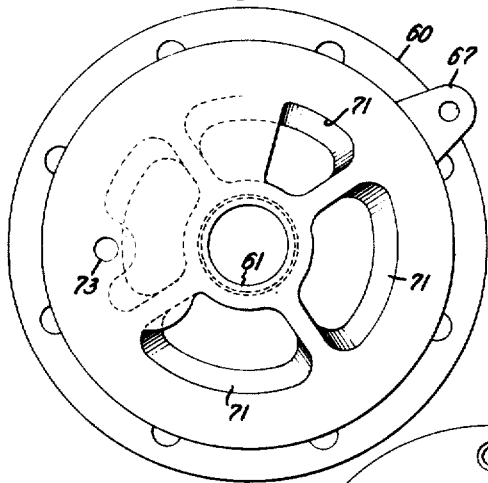
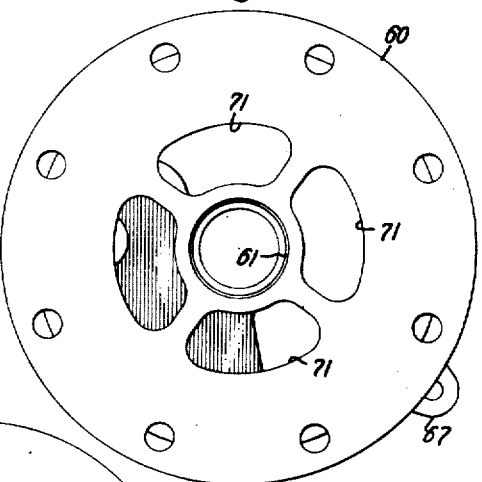
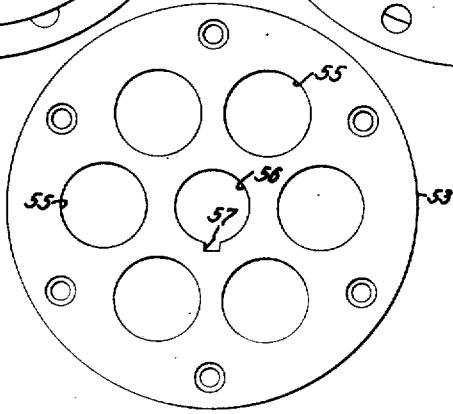
Inventor:
Daniel M. Schwartz
Harold T. Stowell
Attorney

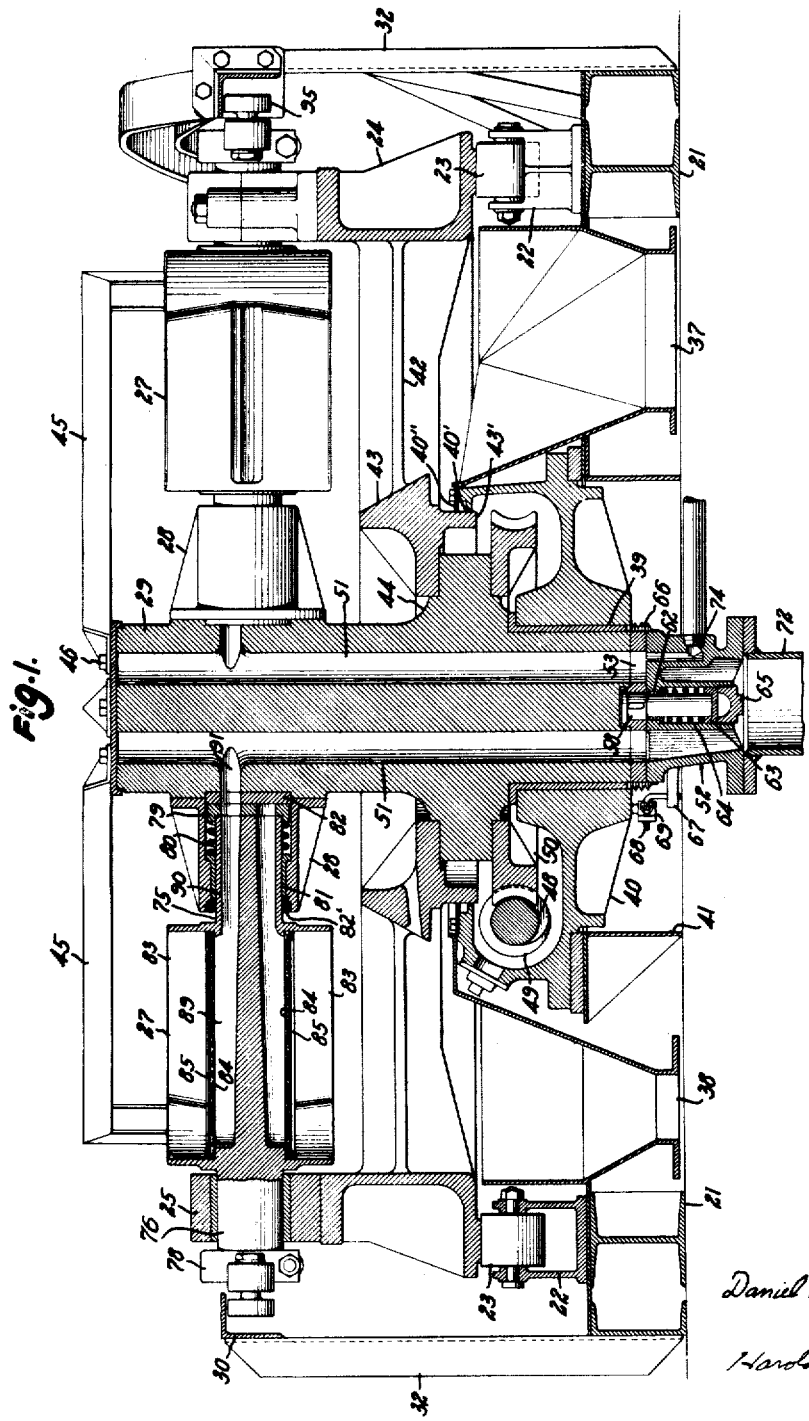

2,811,259

FILTER VALVE CONSTRUCTION

Daniel M. Schwartz, Salt Lake City, Utah, assignor to The Eimco Corporation, Salt Lake City, Utah, a corporation of Utah Original application October 3, 1947, Serial No. 777,829, now Patent No. 2,637,443, dated May 5, 1953. Divided and this application March 27, 1953, Serial No. 344,981

6 Claims. (Cl. 210—328)

This invention relates to an improvement in rotary filters and more particularly to an improved main valve for rotary filters such as rotary pan filters, rotary drum filters, rotary disc filters and the like wherein a main valve is used for providing suction and pressure alternately to one or more filter units of the filtering device.

It is an object of the invention to provide such a device wherein the construction and arrangement of the valve mechanism is sturdy and free from delicate parts that ordinarily are the source of much operating difficulty.

A further object is to provide such a valve that provides a tight fit and is compensated for wear.

Another object is to provide a valve of rugged construction which is mounted on the filter in a manner to eliminate undesirable strains while maintaining a tight sealing relation to the rotating parts of the filter, and which is easy to adjust.

A further object is to provide a filter valve for rotary filters having an effective dust boot, grease retainer and sealing device.

These and other objects and advantages are provided in the novel valve construction for rotary filters of the invention which will be described in detail with reference to the accompanying drawings showing the novel valve applied to a rotary pan filter, of the type disclosed in my copending application Serial No. 777,829, filed October 3, 1947, now Patent Number 2,637,443, of which this application is a division.

In the drawings:

Fig. 1 is a vertical sectional view of a rotary pan filter and main valve means therefor;

Fig. 2 is an enlarged detail sectional view of the main valve and associated parts of the filter taken at opposite hand to the view of Fig. 1;

Fig. 3 is a plan view of the main valve block shown on the same scale as Fig. 2;

Fig. 4 is a bottom view of the valve block of Fig. 3; and

Fig. 5 is a bottom view of the main valve wear plate on the same scale as Fig. 2.

Referring now to the drawings, in which like reference numerals in the several views refer to corresponding parts, the filter illustrated generally in Fig. 1 has a bed 21 which carries brackets 22 mounting a plurality of horizontal rollers 23. The rollers 23 are circularly arranged and support thereon a ring or spider 24 for rotation about the vertical axis of the ring. A plurality of bearing blocks 25 are mounted on the top of the ring, and these in turn support the radially outer ends of filter pans 27, the inner ends of which are carried in bearings 28 mounted on a central column 29. The column, as will appear more fully hereinafter, is mounted in a main bearing for rotation about its vertical axis and the ring 24 is united to the column by structural members for rotation therewith.

The central column 29 is mounted in a main sleeve bearing 39 supported in the worm gear box or housing 40 carried in turn by the frame member 41. It will be seen that the spider 24 is connected by integral radial structural arms 42 to the hub 43 which is bolted or otherwise suitably joined to the collar 44 forming a part of the central column 29.

Power for rotating the filter is supplied to worm shaft 48 from a power source (not shown) and transmitted from the worm 49 to the worm wheel 50 that is bolted or otherwise affixed to the underside of the collar 44.

The hub 43 is removably secured to the collar 44, as by screws (not shown) and has a depending cylindrical skirt portion 43' that projects into the circular opening provided by the annular flange 40' of the gear housing 40 and slidingly engages a packing included between the retainer ring 40", secured to the top of the housing, and the annular flange 40', thus insuring that the interior of the gear housing is properly sealed. It will be noted that the diameter of the opening 40' in the gear housing is slightly greater than the diameter of the worm wheel 50 so that the latter may be conveniently inserted into and removed from the housing.

Central column 29 has a plurality of longitudinal conduits 51, one corresponding to each filter pan, and through these conduits connection is made between the filter pans and the main valve assembly, generally designated 52.

As best seen in Fig. 2, the central column is provided at the bottom with a combined wear plate and valve block support 53 that is secured to the column by screws 54. As shown in bottom view in Fig. 5, the plate 53 has a plurality of holes or column ports 55 that register with the conduits 51 in the column when the plate is bolted in place. The plate also has a central hole 56 provided with a keyway 57 and through this hole depends the valve shaft 58, the shaft being keyed to the plate 53 by means of a key (not shown) inserted in the socket 59 and engaging the keyway 57.

Valve block 60 has a central cylindrical chamber 61 into which the valve shaft 58 depends. The top opening of the chamber is fitted with a bushing 62 in which the shaft 58 rotates. A combination bushing and spring retainer 63 is fastened to the bottom of the valve shaft and rotates in the chamber 61 engaging the interior walls thereof. The spaced bearings or bushings 62 and 63 provided in the valve block 60 provided very satisfactory and stable supports to the valve, thus, substantially eliminating angular displacement between the rotary and stationary valve members. Compressed between the bushing 62 and the spring retainer 63 is a spring 64 which presses the bushing 62 and the valve block into tight sliding engagement with the wear plate 53. The bottom opening of the chamber 61 is closed by a pipe plug 65 which serves to retain grease within the chamber and to protect the interior of the chamber from filtrate.

A dust boot 66 is fastened between the worm gear housing 40 and the valve block 60, both of which remain stationary in operation, to seal the main bearing 39 and protect the seat between the valve block and the wear plate 53. The boot may take the form of a bellows, preferably made of rubberized fabric, and is secured to the gear housing 40 by a ring 60' and to the main valve block by a retaining band 60".

The valve block is prevented from rotating with the central column 29 by connecting it through an adjustable connection to the worm gear housing 40. Such connection includes the arm 67, cast integrally with the block; the angle arm 68, provided with screw threads on its horizontal portion; and the bracket 69 secured to the housing 40, through which the horizontal portion of the arm projects. A nut 70 retains the angle arm 68 in position in the bracket 69, and by adjusting the position of the nut on the arm, it will be seen that the angular relationship of the valve block to the gear housing may be varied within certain limits.

The valve block is provided with suction passages 71 extending through the block and a suction pipe 72 is bolted to the bottom of the block. As will be understood, the suction pipe connects with a conventional evacuator (not shown).

A blow port 73 is provided in the valve block and is connected to a source of compressed air (not shown) through tapped opening 74; or the blow port may be left open to the atmosphere.

Referring to Fig. 1, each of the filter pans has a radial inner trunnion 75, borne in bearing 28 on the center column, and a radial outer trunnion 76, journalled in bearing 25 carried by the outer ring of the spider 24. The outer trunnion 76 has a reduced end portion to which is attached a reversing lever 78.

The inner end of trunnion 75 is provided with a wear plate 79 rigidly fastened to the trunnion, and a spring 80 is compressed between the wear plate 79 and a bushing 81 in the bearing 28. The spring 80 forces the wear plate 79 and the filter pan into sealing engagement with a valve seat 82 carried by the center column. The periphery of the wear plate has clearance within the bearing 28. A sealing ring 82' is received within the outer end of the bearing 28 and engages the trunnion 75 to retain lubricant within the bearing.

Each of the filter pans 27 has an identical filter cell on its top and bottom. The upstanding sides 83 of the cell provide a receiver for a charge of slurry to be filtered. The bottom of the charge receiver is formed of a filter medium consisting of a rigid wire screen 84 overlayed by a piece of filter cloth 85.

Each filter cell has an inner chamber 89 connected by a conduit 90 extending through the inner trunnion to a port 91 leading to one of the vertical conduits 51 in the center column.

An automatic device is provided for rotating each pan one half of a revolution on its trunnions for each revolution of the center column and spider as more fully set forth in my Patent No. 2,637,443.

In operation rotation of the filter is in a clockwise direction. The cycle of operation will be described for a single pan, it being understood that succeeding pans will follow the same cycle with a sixty degree lag.

The cycle will be assumed to start after the suction phase has been completed and the column port of the main valve begins to overlap the blow port 73. The column port and blow port are of such size and so positioned with relation to each other that blowing continues through a 45° rotation of the filter. For the first 5° of the blowing phase, the pan remains horizontal and the cake is raised from the filter cloth and loosened preparatory to dumping. After the 5°, the turning lever 78 and cam 93 begin to cooperate to invert the pan and such operation continues through an arc of 40°; at this point the pan is completely inverted and the cake has been dumped. Blowing pressure is maintained on the upper or cake-containing cell from the 0° position to the 35° position; and, during the last 10° of filter rotation as the turning of the pan is being completed, the blowing pressure is shifted by operation of the pan valve 79—82 to the empty cell just coming into upper position.

After the first 45° of filter rotation the column port passes the blow port, and, during the next 60° of travel, the column port is blanked off by a portion of the solid area of the main valve block as seen in Fig. 3. In this sector, the pan passes under a sluiceway and the upper cell is filled. The blanking off during filling prevents applying suction to the pan until it is completely filled so that air is not drawn through the filter medium reducing suction to the other pans. With materials that are fairly fluid, flowing out freely to cover the bottom of the pan, the blank section may be reduced.

Beginning at 105°, the column port registers with the suction passages 71 in the valve block and suction is applied to the upper cell during substantially the entire balance of the cycle. In the last few degrees of the cycle, the column port is again blanked off by a solid portion of the valve block just prior to registry of the column port and the blow port and the beginning of a new cycle.

It will be understood that the cycle just described is merely exemplary and that the several phases of operation may be varied in duration within wide limits by appropriate valve design. Moreover, the blowing phase may be omitted entirely, if desired.

While the present invention has been described in detail in reference to a rotary pan filter, it will be evident that the novel valve construction may readily be used in horizontal position and that the rotary disc filters or a rotary drum filter could be substituted for the pans 27 without departing from the scope of the present invention.

I claim:

1. In a rotary filtering apparatus including a plurality of filter sections, a relatively rotating port means communicating with the filter sections, a stationary valve block in operative relation with said port means, a valve shaft, one end of said valve shaft secured to said port means for rotation therewith, spaced radial bearings about said shaft in said valve block to maintain alignment of said valve block with said port means, and resilient means between the spaced bearings urging the stationary valve block into contacting engagement with the rotating port means.

2. In a rotary filtering apparatus including a plurality of filter sections, a relatively rotating port means communicating with the filter sections, a stationary valve block in operative relation with said port means, a valve shaft, one end of said valve shaft secured to said port means for rotation therewith, spaced radial bearings about said shaft in said valve block to maintain alignment of said valve block with said port means, and resilient means between the spaced bearings urging the stationary valve block into contacting engagement with the rotating port means, said resilient means and bearings being completely enclosed in a pocket of the valve block to retain lubricant in contact with and exclude contamination from said resilient means and bearing supports.

3. In a filtering apparatus as claimed in claim 2, wherein said valve block has a hollow portion and closure means to seal off the end of the hollow central portion of the valve block away from the port means, to retain lubricant and exclude foreign material.

4. In a rotary filtering apparatus including a plurality of filter sections, a relatively rotating shaft, port means in said shaft communicating with the filter sections, a stationary bearing support for said shaft, a stationary valve block in operative relation to the ports in said shaft, a valve shaft rotating with the shaft means and extending therefrom, spaced radial bearings about said valve shaft in said valve block to maintain alignment of said valve block and said shaft means and a flexible boot between said stationary bearing support and said valve block to seal said stationary bearing support and the port means.

5. In a rotary filtering apparatus including a plurality of filter sections, a relatively rotating shaft means containing port means on its end face communicating with the filter sections, a stationary support for said shaft means, a stationary valve block in operative relation to the ports in said shaft means, said valve block having end face contact with the port means, and a flexible sheath sealing member extending from said stationary support to said valve block to permit movement of said valve block toward said port means to maintain contact of the faces as said faces wear.

6. In a rotary filtering apparatus including a plurality of filter sections, a relatively rotating shaft containing port means on its end face communicating with the filter sections, a stationary support for said shaft, a stationary valve block in operative relation to said port means in said shaft, said valve block having end face contact with the port means, said valve block having a hollow central portion, a valve shaft rotating with the port means and extending therefrom into the hollow central portion of the valve means, a first radial bearing on the valve shaft adjacent the port means and stationary with the valve block, a second radial bearing on the valve shaft spaced from the first bearing support and rigid with the valve shaft, resilient means between the bearing supports urging the valve block into contacting engagement with the rotating port means, and a flexible sheath sealing member extending from said stationary support to said valve block to permit movement of said valve block toward said port means to maintain contact of the faces as said faces wear.

References Cited in the file of this patent

UNITED STATES PATENTS

| | | |
|---|---|---|
| 1,133,853 | Gold | Mar. 30, 1915 |
| 1,429,913 | Keene | Sept. 19, 1922 |
| 1,759,029 | Wishart | May 20, 1930 |
| 2,196,539 | Sperry | Apr. 9, 1940 |
| 2,222,664 | Helle | Nov. 26, 1940 |
| 2,354,478 | Reinhardt | July 25, 1944 |
| 2,489,681 | Smith | Nov. 29, 1949 |
| 2,554,090 | Dameron | May 22, 1951 |
| 2,555,367 | Peterson | June 5, 1951 |
| 2,637,443 | Schwartz | May 5, 1953 |

FOREIGN PATENTS

| | | |
|---|---|---|
| 297,394 | Great Britain | Apr. 11, 1929 |
| 520,520 | Germany | Mar. 12, 1931 |

U. S. DEPARTMENT OF COMMERCE
PATENT OFFICE

CERTIFICATE OF CORRECTION

Patent No. 2,811,259                                            October 29, 1957

Daniel M. Schwartz

It is hereby certified that error appears in the printed specification of the above numbered patent requiring correction and that the said Letters Patent should read as corrected below.

Column 4, line 46, after "hollow" insert --central--.

Signed and sealed this 25th day of March 1958.

(SEAL)
Attest:
KARL H. AXLINE
Attesting Officer

ROBERT C. WATSON
Commissioner of Patents